United States Patent [19]

Smith et al.

[11] Patent Number: 4,868,826
[45] Date of Patent: Sep. 19, 1989

[54] FAULT-TOLERANT OUTPUT CIRCUITS

[75] Inventors: Steven E. Smith, Manhattan Beach; Janusz M. Kucharski, Redondo Beach; Kenneth J. Murphy, West Hills, all of Calif.

[73] Assignee: Triplex, Torrance, Calif.

[21] Appl. No.: 91,086

[22] Filed: Aug. 31, 1987

[51] Int. Cl.$^4$ ................ G06F 11/18; G06F 11/20; G06F 15/26

[52] U.S. Cl. ................ 371/9.1; 364/184; 371/68.1; 371/36

[58] Field of Search .............. 371/7, 8, 9, 36, 57, 371/68, 67; 364/184

[56] References Cited

U.S. PATENT DOCUMENTS

| | | | |
|---|---|---|---|
| 4,015,246 | 3/1977 | Hopkins, Jr. et al. | 371/36 X |
| 4,422,140 | 12/1983 | Keats | 371/36 X |
| 4,687,623 | 8/1987 | Cook | 371/36 X |

Primary Examiner—Jerry Smith
Assistant Examiner—Stephen M. Baker
Attorney, Agent, or Firm—Noel F. Heal

[57] ABSTRACT

Circuit modules for providing digital or analog outputs from computational devices in such a manner that the components of the output circuit modules are tolerant of malfunctions in one or more of the components. In the digital output embodiment of the invention, output signals are independently derived using two voting circuits and are then applied to two switches connected in series to provide a fail-safe condition for most types of failure of the switches or the voting circuits. Two identical modules provide the ability to faithfully follow commanded on or off signals in all but a statistically small number of situations, and permit convenient replacement of a defective module without affecting output through the other module. In an analog output module, two independent voting circuits provide voted digital outputs to separate digital-to-analog converters, the outputs of which are compared to generate a validity signal that is used to control an output switch. The validity signal for the module can be combined logically with the switch status of another identical module, to determine which of the modules should be activated by closure of its output switch. An inactive module can be removed and replaced without affecting the integrity of the analog output signals.

11 Claims, 4 Drawing Sheets

FAULT-TOLERANT OUTPUT CIRCUITS

BACKGROUND OF THE INVENTION

This invention relates generally to fault-tolerant circuits and, more particularly, to output circuits associated with fault-tolerant computers and industrial controllers. The concept of using multiple computational devices to maintain the integrity of a computer-controlled process has been known for some years. The computational devices perform each function separately and the results are compared to determine the "correct" one. A commonly employed configuration has three computational devices and the results are compared in a voting circuit, such that the best two of the three results is taken to be correct. When one of the three computational devices generates erroneous results, it is usually replaced promptly, to avoid the possibility of having two malfunctioning computational devices in operation at the same time. This voting concept may be applied to practically all operations performed by the computational devices, including accessing data storage locations and performing arithmetic or logical computations.

A different, but related problem is the design of output circuits to have a similar type of multiple redundancy. There are two basic types of output from computational devices used as industrial controllers. One type of output consists of "on" and "off" signals and is usually referred to as digital or binary. The other form of output is in the form of an analog signal, which might be used to control, for example, the position of a valve. The valve, in turn, can control a fluid flow rate, a pressure level, or some other physical parameter. Digital output signals are used in control processes to turn direct-current (dc) motors on and off, to open and close solenoid-actuated valves, and to perform various other functions.

One approach to providing the output signals is to connect multiple outputs, from the multiple computational devices, to a voting circuit and then to connect the output of the voting circuit to the control terminal of a dc switch connected between a power supply and a load, such as a motor. The difficulty is that both the voting circuit and the switch are single components subject to failure. A failure of either of these components would probably result in the generation of an erroneous signal, in spite of the presence of multiple computational devices. The same considerations apply to the analog case. One could connect the digital outputs of three computational devices to a single voting circuit supplying a single digital-to-analog converter. Again, failure of either the voting circuit or the converter would probably result in the generation of an erroneous output signal.

From the foregoing, it will be apparent that there is still a need for a configuration of output circuits that is more fault tolerant, in the same sense that the computational devices themselves are rendered fault tolerant by their multiple redundancy. The present invention is directed to this end.

SUMMARY OF THE INVENTION

The present invention resides in a multiple-redundant configuration for an output circuit associated with a plurality of computational devices. The configuration tolerates the failure of at least one component in the output circuit without failing to provide the intended output signal.

Briefly, and in general terms the invention in its broadest form includes two voting circuits, each connected to receive output signals from a plurality of computational devices, to provide two independently voted output signals; fault detection means, for determining if any component in the output circuit has failed; and at least one controlled switch. The latter is switchable in response to a logical combination of the voted output signals and signals generated by the fault detection means, to increase tolerance to fault conditions in the output circuit components.

In one embodiment of the invention, specifically concerned with the output of digital control signals, the output circuit comprises two voting circuits, each connected to receive output signals from a plurality of computational devices, to provide two independently voted output signals, and two electrically controllable switches connected in series in a circuit to be controlled. The output signals from the voting circuits are connected separately to control the two switches, whereby a malfunction in either of the voting circuits or either of the switches will have one of two possible results. Either a switch will fail in the ON state, in which case the redundant series switch still maintains proper control of the load, or, at worst, a switch will fail in the OFF state, which is a failsafe condition in which the circuit to be controlled is also OFF. Ideally, the circuit also includes means for detecting whether either of the switches fails to turn on or off.

A most useful form of the invention includes two identical modules like the one just described. The output signals from the voting circuits in each module are connected separately to control the two switches in the module, and the series-connected switch pair in one module is connected in parallel with the series-connected switch pair of the other module. The two modules provide redundant means for controlling the same circuit, and will carry out an intended ON or OFF command in an extremely fault-tolerant manner.

The fault detection means in each module includes means for generating periodic test pulses, and means for logically combining the test pulses with the output signals from the voting circuits, such that each switch commanded to the OFF state is periodically switched ON by a test pulse, and each switch in the ON state is periodically switched OFF by a test pulse.

The analog output form of the invention includes means for deriving an analog output signal from a plurality of computational devices, means for determining whether the analog output signal is valid and generating a module validity signal, and switch means for enabling or disabling analog output from the module by switching it to a high-impedance state. In an extremely useful form of this embodiment, two identical modules are employed, and each also includes logic means for combining the module validity signal and the state of the switch means in the other module, thereby generating a switch means control signal. Only one of the modules is active at any time, with its controllable switch means in the ON condition, and the logic means ensures that the other module does not become active unless a failure is detected in the active module.

More specifically, the means for deriving an analog output signal includes two voting circuits, each connected to receive digital output signals from the plurality of computational devices, to provide two independently voted output signals indicative of a commanded analog output level, and two digital-to-analog converters connected to receive inputs from the respective voting circuits, to provide two independently derived analog output signals. The means for determining whether the analog output signal is valid and generating a module validity signal, includes an analog comparator connected to receive as inputs the outputs of the digital-to-analog converters, and to provide a binary output signal indicative of whether or not the two analog output signals match.

In the previously mentioned form of the invention having two analog output circuit modules, the logic means in each module includes a logic function gate having one input derived from the comparator in the same module and one input derived from the inverse of the output of the logic function gate in the other module. The logic function gates in the two modules are thereby cross-connected to form a flip-flop circuit distributed between the two modules.

It will be appreciated from the foregoing that the present invention represents a significant advance in the field of fault-tolerant output circuits. In particular, the invention ensures that commanded digital or analog output signals are generated reliably, without dependence on the integrity of particular components of the circuitry. The output circuits of the invention are conveniently constructed in modules that can be easily removed and replaced without affecting the desired output conditions. Other aspects and advantages of the invention will become apparent from the following more detailed description, taken in conjunction with the accompanying drawings.

DESCRIPTION OF THE PREFERRED EMBODIMENTS

Figure 1:
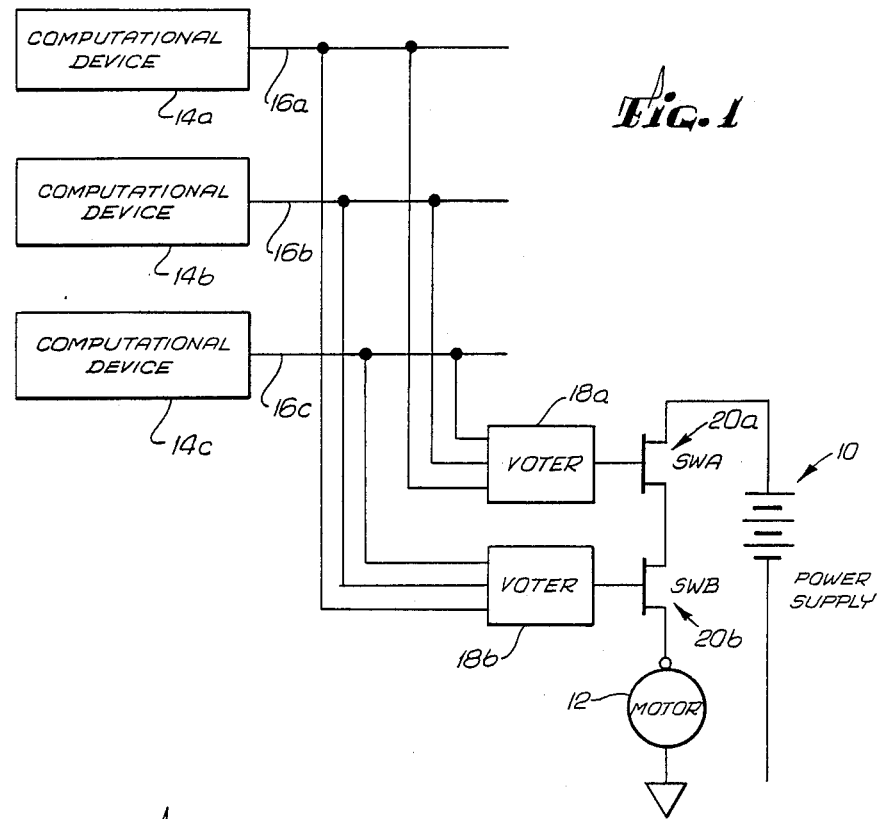
FIG. 1 is a simplified block diagram of a dc output circuit in accordance with the invention.

As shown in the drawings for purposes of illustration,, the present invention is concerned with providing fault tolerance in output circuits in industrial control systems and the like. Although systems exist to provide redundancy and fault tolerance at a computational level, output control signals should ideally be applied through output circuits that are also resistant to component malfunctions. Two principal types of control signals may be characterized as digital or on-off signals, and analog signals.

In accordance with the invention, output control signals are not only "voted" to eliminate a possible erroneous signal, but voting circuits and output switches are duplicated in such a manner as to eliminate the possibility of an output fault caused by a single component failure. In both the digital and analog output cases, components are continually monitored for correctness of operation, so that defective components may be replaced prior to the possible occurrence of a second failure.

FIG. 1 shows the simplest form of the invention, for controlling a direct-current (dc) circuit having, for example, a power supply, indicated by reference numeral 10, and a dc motor 12. A control system, which is not shown in full, includes three identical computational devices 14a, 14b and 14c that generate output signals to control the on-off condition of the motor 12. The control signals, on output lines 16a, 16b and 16c are applied to two identical voting circuits 18a, 18b, which determine the correct output signal based on a "vote" of the input signals. The voted output signals are then applied to control two series-connected switches 20a and 20b, which connect the power supply 10 to the motor 12.

Digital outputs for the control of motors and similar loads usually have a preferred or "fail-safe" condition. If an ON signal is commanded and the motor fails to turn on, this is normally considered to be an acceptable failure condition, so long as the condition is quickly detectable and can be remedied. On the other hand, if an OFF signal is commanded and the motor inadvertently stays on, this is normally an unacceptable failure condition. If a single voting circuit and a single switch were used to control the motor 12, there would be, in theory, an equal probability that the switch could fail in the ON condition as in the OFF condition. Thus there is a high probability of a failure of the unacceptable type.

In the configuration of FIG. 1, on the other hand, the likelihood of an unacceptable failure condition is extremely small, as indicated in Table 1 below, showing possible combinations of failure conditions, in which the switches 20a, 20b are indicated as A and B:

TABLE 1

| A off | A on | B off | B on | A off B off | A on B on | A off B on | A on B off |
|---|---|---|---|---|---|---|---|
| OK | OK | OK | OK | OK | BAD | OK | OK |

The top row of the table indicates the failure condition. For example, "A off" means that switch A fails in the OFF condition, i.e. it cannot be switched on. The last four columns of the table indicate failures of both switches. The "OK" condition means that the controlled motor or other load can either be switched off by one of the two switches, or that the output circuit as a whole will fail in the generally safe OFF condition. Because switches 20a, 20b are connected in series, the failure of either one of them in the ON condition is not fatal to the overall circuit, since the other switch can still be switched off. Also, the failure of one or both switches in the OFF condition is not fatal if, as is usual, the OFF condition is a safe failure condition for the controlled motor 12. The only unacceptable failure condition occurs when both switches fail in the ON condition. The likelihood of this condition is extremely low. For example, if there is a probability of 1% that one switch will fail in the ON condition during a preselected time period, and an equal probability that it will fail in the OFF condition, the use of a single switch to control the motor will result in a 1% probability of unacceptable failure within the time period under consideration. On the other hand, if two series switches are employed in the configuration of FIG. 1, the probability of an unacceptable failure during the same time period is only 0.01×0.01, or 0.01%. As will now be further explained, the probability of an unacceptable failure can be reduced even further by the use of multiple modules of the type shown in FIG. 1.

Figure 2:
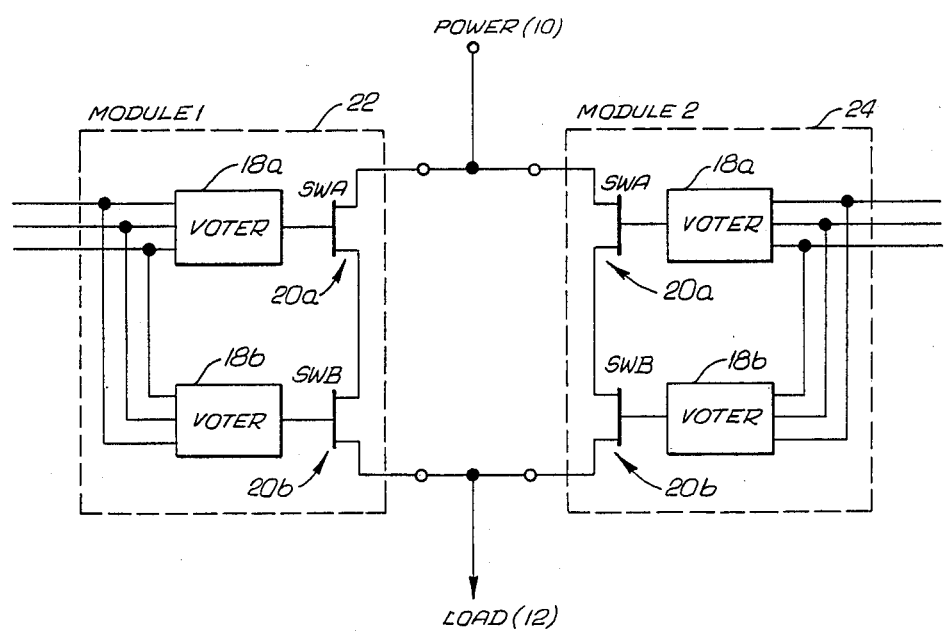
FIG. 2 is a simplified block diagram of a two-module dc output circuit similar to that shown in FIG. 1.

FIG. 2 shows two identical dc output modules of the type shown in FIG. 1. The modules, indicated at 22 and 24, are connected by external wiring to the power supply 10 and load 12, such that the series-connected pairs of switches 20a, 20b are connected in parallel. Thus, power can be applied to the load through either or both pairs of switches, and one module may be totally removed and replaced without affecting the control of the load. When this arrangement also includes circuitry for the detection of faults in the modules, a defective module can be promptly replaced before the possible occurrence of a defect in the other module.

It will be seen that this arrangement is not only "fail-safe" but is "fail-operational." That is to say the failure of one component will not affect the intended switching result. For example, if it is intended to switch the load ON but one of the switches fails in the OFF condition, the other switching module will still ensure that the load is switched to the ON condition. Similarly, if it is intended to switch the load OFF but one of the switches fails in the ON condition, the series switch connection in each module will still ensure that the load is switched to the OFF condition. The only condition that results in an unintended operation arises when both switches in the same module fail in the ON condition and it is intended to switch the load OFF. As will be discussed, the failure of any one switch can be detected by appropriate circuitry within each module, and the module can usually be replaced before the failure of the second switch in the module can occur. The probability of both switches in the same module failing in the ON condition at nearly the same time is extremely low. One measure of a low probability of failure is a long mean time between failures (MTBF). For the configuration described, the mean time between failures is believed to be measured in hundreds of years.

Figure 3:
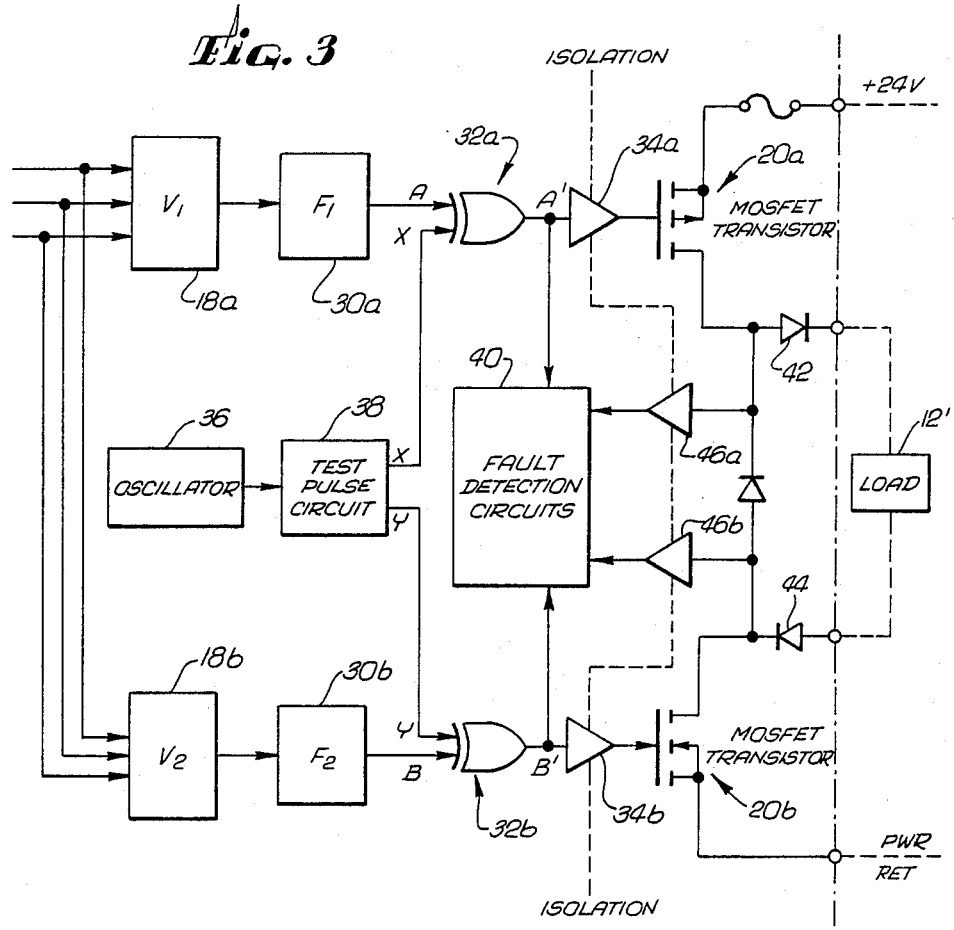
FIG. 3 is a more detailed block diagram of the circuit of FIG. 1.

FIG. 3 is a more detailed schematic diagram of the module illustrated in FIG. 1. Outputs from the voting circuits are shown as passing through respective signal conditioning circuits 30a, 30b, and through two respective exclusive OR (XOR) gates 32a, 32b. The outputs of the XOR gates pass through isolators 34a, 34b before controlling the switches 20a, 20b, which are shown as MOSFETs (metal oxide semiconductor field-effect transistors). The load, indicated at 12', is connected between the two switches 20a, 20b. The output circuit also includes an oscillator 36, supplying a test pulse shaping circuit 38, which in turn supplies test pulses, indicated as X and Y respectively, to one input of each of the XOR gates 32a, 32b. The other inputs to the XOR gates are referred to in the subsequent discussion as A and B respectively, while the outputs of the XOR gates are referred to as A' and B'.

The XOR gate outputs A' and B' are also connected to fault detection circuitry, indicated at 40, which also monitors the conditions of the switches 20a, 20b. The dc power circuit extends from the power supply 10 through the first switch 20a, then through a diode 42 to the load 12', then through another diode 44 to the second switch 20b, and finally to the power supply return. The junction between the first switch 20a and diode 42 is coupled to the fault detection circuitry 40 through another isolator 46a, and the junction between the second switch 20b and diode 44 is coupled to the fault detection circuitry through another isolator 46b.

The isolators are for the purpose of isolating the circuit being controlled, in this case the dc motor circuit, from control logic associated with the output circuit of the invention. Isolation is conventionally provided with the combination of a light-emitting diode and a phototransistor.

Figure 3A:
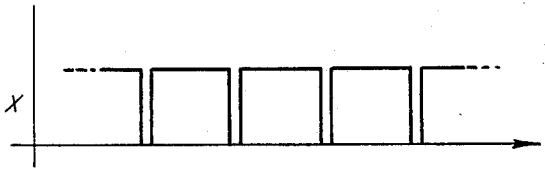
FIGS. 3a and 3b are simplified graphs of test pulse waveforms used in the circuit of FIG. 3.
Figure 3B:
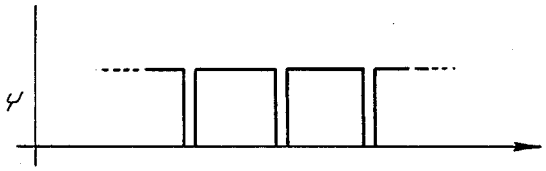

The test pulses X and Y generated in the test pulse shaping circuit 38 are substantially as shown in FIGS. 3a and 3b. Each signal (X and Y) is maintained at a high or logical "1" level for most of the time, but pulses to a low or logical "0" level approximately every second. The duration of each pulse is approximately 300 microseconds or less. Moreover, the X and Y pulses are not concurrent but are offset in time as shown in FIGS. 3a and 3b.

The relationship between the test pulses X and Y and the A, B, A' and B' signals is shown in Table 2 below:

TABLE 2

| Output Command | A/B | X/Y | A'/B' | Comment |
| --- | --- | --- | --- | --- |
| ON | 0 | 0 | 0 | Test turnoff ability |
| ON | 0 | 1 | 1 | Turn-on normal operation |
| OFF | 1 | 0 | 1 | Test turnoff ability |
| OFF | 1 | 1 | 0 | Turnoff normal operation |

When the output command is ON, the signals A and B are "0" and these are complemented in the XOR gates to produce a "1" signal at A' and B' when no test pulse is occurring. During each test pulse (X or Y=0), the A' or B' signal is temporarily dropped to a logical "0" and the corresponding switch 20a or 20b is opened for a very short time. Since most of the loads being controlled are high-intertia devices like motors, this brief interruption in the power supply is not significant. While the switches are commanded to the OFF state, the same test pulses are effective to switch the switches temporarily to the ON state, but since the X and Y signals are offset in time both switches are never turned on together. The test pulses propagate back to the fault detection circuitry 40, which controls a conventional watchdog timer circuit (not shown). The well known principle of the watchdog timer is that it must be reset within some selected time period in order to prevent the occurrence of an alarm condition. In this case, the timer is reset by the detection of the X and Y test pulses as they propagate back from the switches 20a, 20b. If either switch fails to open or close as commanded by one of the test pulses, the timer will not be reset and an error condition will be communicated to personnel operating the system.

Figure 4:
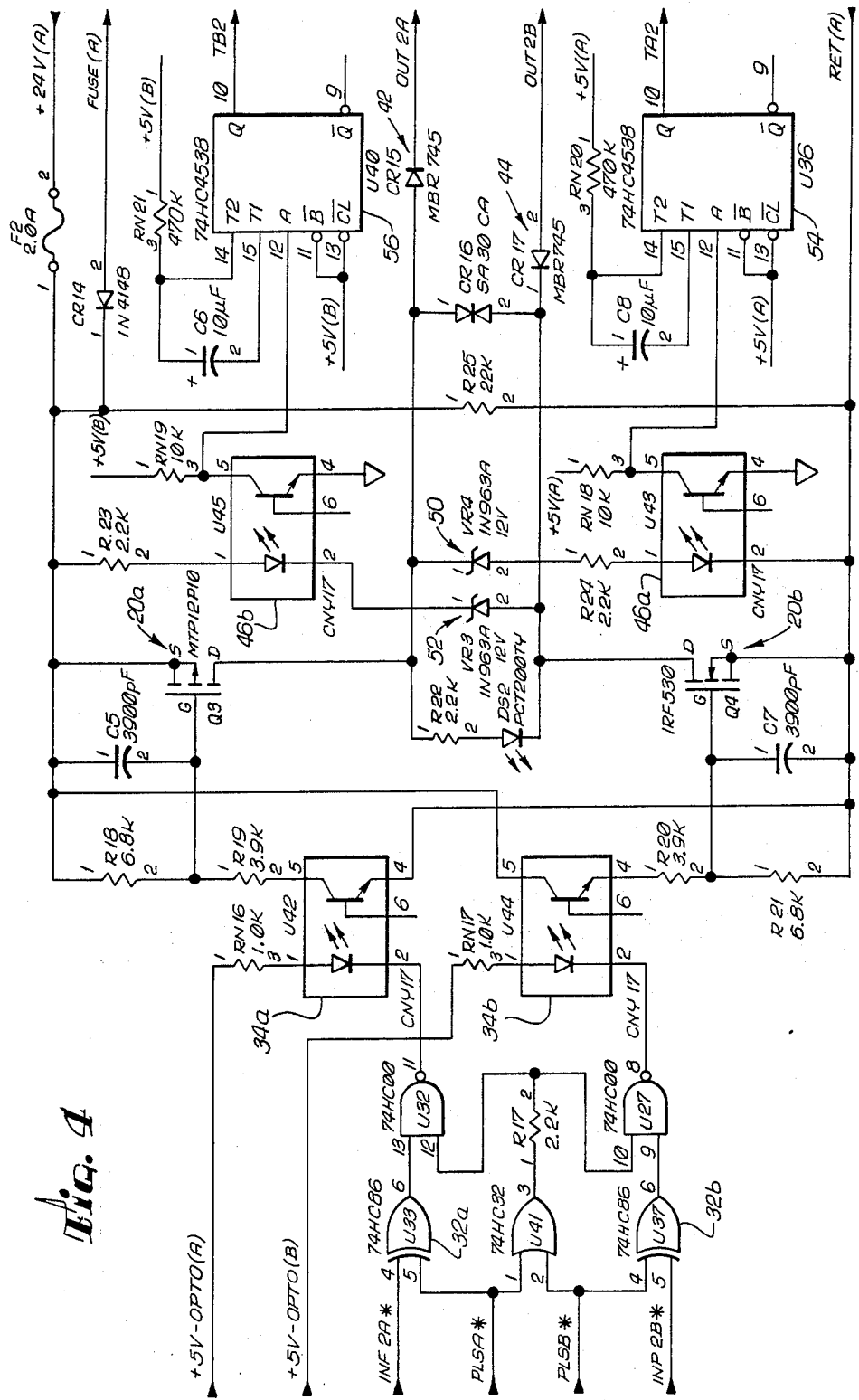
FIG. 4 is a more detailed schematic diagram of portion of a dc output circuit similar to that shown in FIGS. 1 and 3.

FIG. 4 is a detailed schematic diagram of a portion of an output circuit like the one shown in FIGS. 1 and 3. The same reference numerals have been used, where appropriate, to indicate equivalent components. The FIG. 4 schematic also indicates standard part numbers for various circuit components. It will be more apparent from this schematic diagram how the fault detection circuitry 40 of FIG. 3 is implemented in the presently preferred embodiment of the invention. The first switch 20a is connected to Zener diode 50 and then through the isolator 46a to the power supply return. Similarly, the second switch 20b is connected through another Zener diode 52 and thence through isolator 46b and to the power supply line. The output of isolator 46a is coupled to a watchdog timer circuit 54, and the output of isolator 46b is coupled to another watchdog timer circuit 56.

When it is intended that both switches 20a, 20b be in the OFF condition, and a test pulse is applied to switch 20a to switch it on, a circuit is established through switch 20a, Zener diode 50, and isolator 46a. Therefore, a pulse appears at the output of the isolator 46a and resets the timer 54. Similarly, when the other switch 20b is pulsed to the ON condition, a circuit is established through isolator 46b, Zener diode 52, and the switch 20b, thereby providing a pulse from the isolator and resetting the timer 56.

When both switches 20a, 20b are in the ON condition, the two paths through the Zener diodes 50, 52 are established together, but an interruption in either path, caused by the pulsing OFF of one of the switches, causes a pulse output from one of the isolators 46a, 46b, and resets one of the timers 54, 56. The timers are arranged to require a reset pulse within 3 seconds before generating an alarm signal, and the test pulses are provided every second. If three consecutive test pulses applied to one of the switches do not propagate through to the appropriate timer 54, 56, a malfunction is assumed to exist.

Figure 5:
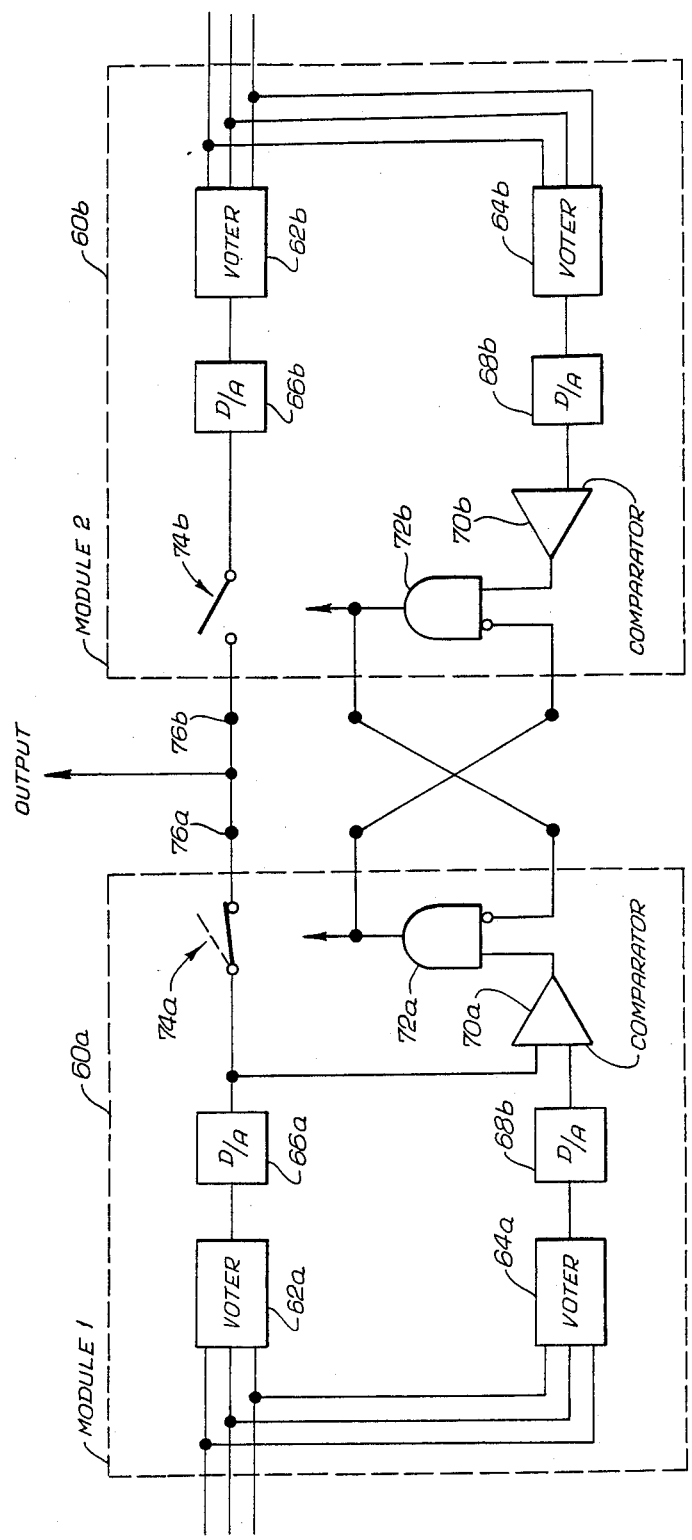
FIG. 5 is a simplified schematic diagram of an analog output circuit in accordance with the invention.

In the analog output circuit in accordance with the invention, as shown in FIG. 5, two circuit modules 60a, 60b are normally employed, but only one of them provides the desired analog output signal at any time. The other module performs the same voting and digital-to-analog conversions as the active module, but its output is disabled so long as the active module continues to provide accurate output signals. In the following discussion, the same reference numerals are employed for both modules, with the suffixes a and b indicating which module is referred to. Each module has two voting circuits 62 and 64, and two independent digital-to-analog converters 66 and 68. The voting circuits 62, 64 are basically digital voting circuits, producing an output that is the majority-vote of its three digital inputs. The voted outputs are converted to analog form in the converters 66, 68, and then input to an analog comparator 70, which produces a binary output indicative of whether the two analog inputs are equal to each other to within a preselected margin. The binary output of the comparator 70 is applied as one input to an AND gate 72, the output of which is used to control the position of a switch 74. The other input to the AND gate is an inverted input. The switch 74 is connected between the output of one of the converters 66 and an output terminal 76. Output terminals 76a and 76b are connected in common to provide a single output signal from the pair of modules 60. Completing the circuitry are cross-connections between the AND gates 72. Thus, the output of AND gate 72a is externally connected to the inverted input of AND gate 72b, and the output of AND gate 72b In operation, if the two converters 66, 68 of the same module provide nearly identical outputs it is assumed that the module is operating properly.

The comparator 70 then generates a logical "1" output, which is applied as an input to the AND gate 72. Assuming, for the moment, that switch 74a is closed and switch 74b is open, AND gate 72a will generate a logical "1" at its output, to hold switch 74a closed, and AND gate 72b will have a logical "0" output. The cross-connected AND gate outputs will be fed back to opposite inverted inputs of the AND gates, which will hold the outputs stably in this condition. The output conditions will be reversed only if one module detects a malfunction and the other module is off but not defective. In the example in which the A module is providing the output, through its closed switch 74a, if a malfunction is detected on the A module, there will be a "0" output from the comparator 70a, which will produce a "0" output from AND gate 72a. This output will feed back to AND gate 72b as a logical "1", which will provide a "1" output from the B module AND gate, thereby closing switch 74b.

The AND gates 72 and their cross-connections form a simple flip-flop, the structure of which is distributed between the two circuit modules 60. The state of the flip-flop determines which of the two modules is currently active, and the monitored state of each module determines when the flip-flop will be switched from one state to the other.

An important property of the distributed flip-flop formed by the two AND gates 72 is that the module that has a logical "0" output, i.e. the inactive module, can be removed without affecting the active module. The inactive module provides a logical "0" input through its cross-connection to the active module. If logical "0" is represented by a zero voltage level, removal of the inactive module will have no effect on the active module. Therefore, the inactive module can be removed and replaced as soon as a defect has been detected, without interrupting operation of the apparatus being controlled.

A single module of the analog output type has more limited application, but does provide a fail-safe type of operation analogous to the failsafe operation of the digital output circuit module of FIG. 1. Upon detection of a fault by the comparator 70, the switch 74 will be turned off, as described in relation to the dual module system of FIG. 5. If only one module is present, this provides a zero output from the module, which is typically the output level providing a fail-safe condition in analog control systems.

It will be appreciated from the foregoing that the present invention represents a significant advance in the field of fault tolerant control systems. In particular, the invention provides an output circuit configuration that is tolerant to faults in at least one component and has an extremely long mean time between failures. It will also be appreciated that, although various embodiments of the invention have been described in detail for purposes of illustration, various modifications may be made without departing from the spirit and scope of the invention. Accordingly, the invention is not to be limited except as by the appended claims.

We claim:

1. A fault-tolerant output circuit for digital controller output signals, the circuit comprising:
    two identical circuit modules, each having two voting circuits connected to receive output signals from a plurality of computational devices, to provide two independently voted output signals, and two electrically controllable switches connected in series in a circuit to be controlled;
    wherein the output signals from the voting circuits in each module are connected separately to control the two switches in the module and the series-connected switches in one module are connected in parallel with the series-connected switches of the other module;
    whereby the two modules provide redundant means for controlling the same circuit, and will carry out an intended ON or OFF command in a fault-tolerant manner;

and wherein either of the two modules can be removed and replaced without affecting the proper ON/OFF operation of the circuit to be controlled.

2. A circuit as defined in claim 1, and further comprising:

fault detection means within each module, for detecting inability of a module switch to respond to ON or OFF signals.

3. A circuit as defined in claim 2, wherein the fault detection means includes:

means for generating periodic test pulses; and means for logically combining the test pulses with the output signals from the voting circuits;

wherein each switch commanded to the OFF state is periodically switched on by a test pulse and each switch in the ON state is periodically switched off by a test pulse.

4. A fault-tolerant output circuit for generating analog output signals, the circuit comprising:

two voting circuits, each connected to receive digital output signals from a plurality of computational devices, to provide two independently voted output signals indicative of a commanded analog output level;

two digital-to-analog converters connected to receive inputs from the respective voting circuits, to provide two independently derived analog output signals;

an analog comparator connected to receive as inputs the outputs of the digital-to-analog converters, and to provide a binary output signal indicative of whether or not the two analog output signals match; and a controllable switch connected between an output from one of the digital-to-analog converters and an output terminal, the switch having a control terminal to which the output of the comparator is coupled;

whereby detection of non-matching analog outputs from the digital-to-analog converters has the effect of disabling analog output from the entire output circuit.

5. A fault-tolerant output circuit for generating analog output signals, the circuit comprising:

two circuit modules, each including two voting circuits, each connected to receive digital output signals from a plurality of computational devices, to provide two independently voted output signals indicative of a commanded analog output level, two digital-to-analog converters connected to receive inputs from the respective voting circuits, to provide two independently derived analog output signals, an analog comparator connected to receive as inputs the outputs of the digital-to-analog converters, and to provide a binary output signal indicative of whether or not the two analog output signals match, a controllable switch connected between an output from one of the digital-to-analog converters and an output terminal, which is common to both modules, the switch having a control terminal to which the output of the comparator is indirectly coupled, and logic means for combining the comparator output and the logical state of the controllable switch of the other of the two circuit modules, to generate a control signal connected to the switch;

wherein only one of the modules is active, with its controllable switch in the ON condition, and the logic means ensures that the other module does not become active unless a failure is detected in the active module.

6. A circuit as defined in claim 5, wherein:

the logic means in each module includes an AND gate having one input derived from the comparator in the same module and one input derived from the inverse of the output of the AND gate in the other module.

7. A fault-tolerant output circuit for generating analog output signals, the circuit comprising:

two circuit modules, each including means for deriving an analog output signal from a plurality of computational devices;

means for determining whether the analog output signal is valid and generating a module validity signal, switch means for enabling or disabling analog output from the module, logic means for combining the module validity signal and the state of the switch means in the other module, and thereby generating a switch means control signal for the module;

wherein only one of the modules is active, with its controllable switch means in the ON condition, and the logic means ensures that the other module does not become active unless a failure is detected in the active module.

8. A circuit as defined in claim 7, wherein the means for deriving an analog output signal includes:

two voting circuits, each connected to receive digital output signals from the plurality of computational devices, to provide two independently voted output signals indicative of a commanded analog output level; and two digital-to-analog converters connected to receive inputs from the respective voting circuits, to provide two independently derived analog output signals.

9. A circuit as defined in claim 8, wherein the means for determining whether the analog output signal is valid and generating a module validity signal, includes:

an analog comparator connected to receive as inputs the outputs of the digital-to-analog converters, and to provide a binary output signal indicative of whether or not the two analog output signals match.

10. A circuit as defined in claim 9, wherein:

the logic means includes, a logic function having one input derived from the comparator in the same module and one input derived from the inverse of the output of the logic function gate in the other module.

11. A fault-tolerant output circuit as defined in claim 7, wherein:

either of the two modules can be removed and replaced without affecting the proper analog output operation of the output circuit.

* * * * *

UNITED STATES PATENT AND TRADEMARK OFFICE
CERTIFICATE OF CORRECTION

PATENT NO.   :   4,868,826
DATED        :   September 19, 1989
INVENTOR(S)  :   Steven E. Smith et al.

It is certified that error appears in the above-identified patent and that said Letters Patent is hereby corrected as shown below:

Column 7, line 56 after the word "72b" insert -- is connected to the inverted input of AND gate 72a.--.

Signed and Sealed this

Twenty-third Day of February, 1993

*Attest:*

STEPHEN G. KUNIN

*Attesting Officer*         *Acting Commissioner of Patents and Trademarks*